United States Patent [19]
Bergmann

[11] Patent Number: 5,923,472
[45] Date of Patent: Jul. 13, 1999

[54] 3-PORT OPTICAL CIRCULATOR/SWITCH WITH MIRROR

[75] Inventor: Ernest Eisenhardt Bergmann, Fountain Hill, Pa.

[73] Assignee: Lucent Technologies Inc., Murray Hill, N.J.

[21] Appl. No.: 08/819,537

[22] Filed: Mar. 17, 1997

[51] Int. Cl.$^6$ .............................. G02B 27/10; G02B 6/26
[52] U.S. Cl. .............................................. 359/618; 385/31
[58] Field of Search .................................... 359/618, 629; 385/15, 16, 18, 31, 36

[56] References Cited

U.S. PATENT DOCUMENTS

| | | | |
|---|---|---|---|
| 4,516,837 | 5/1985 | Soref et al. | 385/16 |
| 5,204,771 | 4/1993 | Koga | 359/281 |
| 5,724,165 | 3/1998 | Wu | 359/117 |
| 5,754,714 | 5/1998 | Suzuki et al. | 385/5 |

OTHER PUBLICATIONS

M. Koga, "Compact quartzless optical quasi–circulator", *Electronic Letters*, Aug. 18, 1994, pp. 1438–1440.

*Primary Examiner*—Georgia Epps
*Assistant Examiner*—Ricky Mack

[57] ABSTRACT

The present invention is a three port optical circulator including a reflective device such as a mirror. Advantageously, the incorporation of the mirror into the circulator of the present invention enables two ports of the circulator to be terminated using a dual fiber termination and a shared collimating system such as a single GRIN. According to one advantageous embodiment of the invention an optical apparatus of the present invention comprises first and second polarization splitter/combiners including walk-off devices having a splitting end and a combining end. The polarization splitter/combiners further include a polarization interchanger disposed proximate input/output ports at the combining end of the walk-off device. A generalized polarization splitter/combiner further includes another walk-off device having input/output ports at a first end thereof and input/output ports at a second end thereof, the first generalized polarization splitter/combiner including a reflective polarization interchanger disposed proximate input/output ports at the second end. The generalized polarization splitter/combiner is coupled between the first and second polarization splitter/combiner. The device also includes a non-reciprocal polarization interchanger positioned between the second polarization splitter/combiner and first generalized polarization splitter/combiner. The apparatus illustratively functions as a 3-port circulator/1×2 switch.

33 Claims, 4 Drawing Sheets

3-PORT OPTICAL CIRCULATOR/SWITCH WITH MIRROR

RELATED APPLICATIONS

The present patent application is related to U.S. patent application, Ser. No. 08/578,721, entitled OPTICAL APPARATUS (Bergmann-24), filed Dec. 26, 1995, that application having a common inventor and being incorporated herein by reference.

TECHNICAL FIELD

This invention relates generally to the field of optical devices and more particularly to optical devices, such as circulators, isolators and switches, that are used in optical communications systems.

BACKGROUND OF THE INVENTION

Optical communications systems, as well as other optical technologies, require apparatus that manipulates optical signals that are in the form of light rays. One of the best known apparatus for such manipulation is the silica based optical fiber which is widely used for both short and long distance optical transmission. Additionally, other well known apparatus include couplers and multiplexers that have been developed to couple one or more optical signals into one or more optical fibers or waveguides. Some applications for transmission of optical signals also desirably use non-reciprocal apparatus or devices, where the propagation characteristics of light within the apparatus depends upon the direction of light propagation within the apparatus.

One type of such non-reciprocal apparatus, commonly referred to as an optical isolator, permits light tatpass through the apparatus in one direction but not in the reverse direction. Another type of such non-reciprocal apparatus is termed an optical circulator. An optical circulator has 3 or more ports which permit light to pass from a first to a second port, for example, but not from the second port to the first port; instead light entering the second port passes to a third port. An isolator may be thought of as a two-port circulator. However, the term isolator is the preferred term.

Many types of optical devices, including circulators and isolators, have been developed for commercial applications. For many applications, such a device should be polarization independent to the external world; that is, device operation should not depend upon the polarization of the incoming light. For example, Fujii in Journal of Lightwave Technology, Vol. 10, pp. 1226–1229, Sep. 1992, describes a polarization independent apparatus that as stated can be used as an optical circulator. Although stated to be usefull over a wide range of wavelengths, preferred operation of the apparatus depends upon precise orientation of the components with respect to each other. Another optical circulator is described in U.S. Pat. No. 5,204,771 issued to Koga on Apr. 20, 1993. The essence of the Koga circulator appears to be the use of a birefringent plate followed by non-reciprocal optical rotators. The birefringent plate splits the incoming beam into two parallel beams, and the optical rotators change the polarizations of each of the two beams by 45 degrees so that there are two parallel beams with orthogonal polarizations.

Consideration of the devices described in the previous paragraph reveals aspects that make their use disadvantageous in some situations. As mentioned, the Fujii circulator depends upon precise relative orientation of the components. This orientation may be difficult to achieve in practice and still more difficult to maintain for extended periods of time. The Koga device is extremely complicated. The complexity arises not only because there are many components, where the individual components are made up of multiple connected plates, but also because the large number of components necessarily has a large number of surfaces. Any one of these surfaces can produce undesired reflections. The devices must be designed to either eliminate the reflections or to compensate for them. Additionally, the optical rotators must be precisely aligned so that one beam passes through the top half of the rotator and the other beam passes through the bottom half of the rotator. The small beam sizes and small separation of the beams will likely make this difficult. Accordingly, there is a need for an optical circulator device which is simpler to manufacture and maintain than those devices found in the prior art.

SUMMARY OF THE INVENTION

The present invention is a three port optical circulator including a reflective device such as a mirror. Advantageously, the incorporation of the mirror into the circulator of the present invention enables two ports of the circulator to be terminated using a dual fiber termination and a shared collimating system such as a single GRIN.

According to one advantageous embodiment of the invention an optical apparatus of the present invention comprises a first polarization splitter/combiner including a first walk-off device having a splitting end and a combining end, the splitting end including a single input/output port and the combining end including two input/output ports, where the first polarization splitter/combiner further includes a first polarization interchanger disposed proximate one of the two input/output ports at the combining end of the first walk-off device. The apparatus includes a second polarization splitter/combiner including a second walk-off device having a splitting end and a combining end, the splitting end including two input/output ports and the combining end <including four input/output ports, where the second polarization splitter/combiner further includes a second polarization interchanger disposed proximate two of the four input/output ports at the combining end of the first walk-off device. A first generalized polarization splitter/combiner further includes a third walk-off device having four input/output ports at a first end thereof and four input/output ports at a second end thereof, the first generalized splitter/combiner including a reflective polarization interchanger disposed proximate two of the four input/output ports at the second end. The first generalized polarization splitter/combiner is coupled between the first and second polarization splitter/combiner such that the four input/output ports at the combining end of the second walk-off device couple to the four input/output port of the first end of the third walk-off device, and such that two of the four input/output ports of the third walk-off device, not including two of the four input/output ports of the third walk-off device coupled to the reflective polarization interchanger, couple to the two input/output ports at the combining end of the first walk-off device. The device also includes a non-reciprocal polarization interchanger positioned between the second splitter/combiner and the first generalized polarization splitter/combiner.

The apparatus illustratively functions as a 3-port circulator/1×2 switch.

BRIEF DESCRIPTION OF THE DRAWINGS

A more complete understanding of the present invention may be obtained from consideration of the following description in conjunction with the drawings in which.

DETAILED DESCRIPTION

Figure 1:
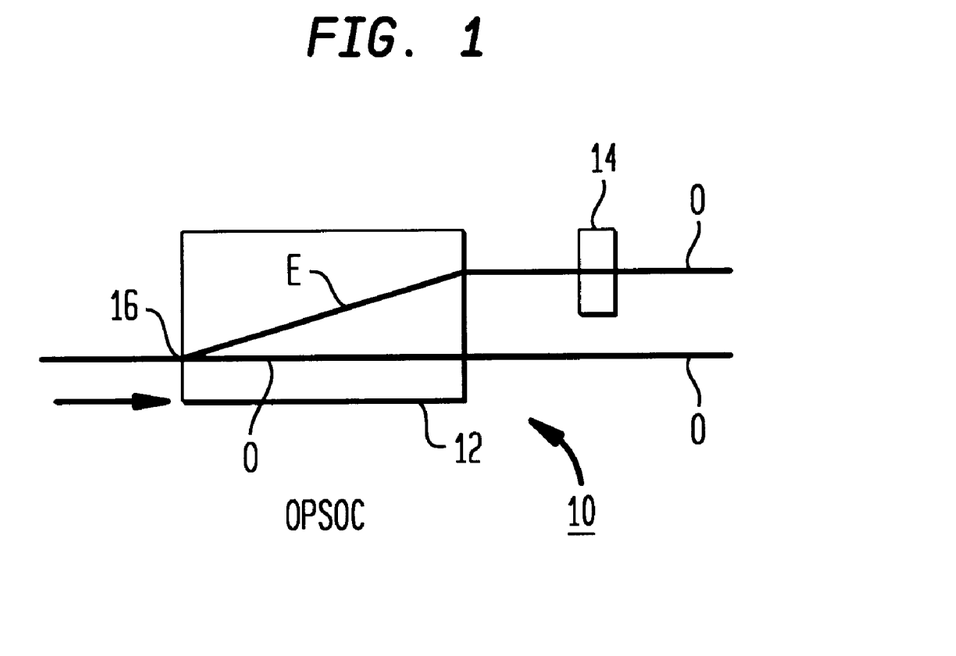
FIG. 1 is a sectional view of an O polarization splitter or combiner (OPSOC) optical device used in conjunction with the present invention.

Referring to FIG. 1, there is shown one exemplary embodiment of an optical device 10 termed an Ordinary Polarization Splitter Or Combiner (OPSOC) used in conjunction with the present invention. As shown in FIG. 1, the OPSOC 10 is comprised of a walk-off device 12 and polarization interchanger 14, for example, a half wave plate or other 90 degree rotator which interchanges the polarization of a beam applied thereto by 90 degrees. As used in the instant application, the term polarization interchanger is intended to cover a wide variety of devices which transform polarization from one state to another. The direction of propagation of an incoming light beam is designated by the arrow. As shown, the walk-off device splits the incoming light beam into "ordinary" and "extraordinary" polarized beams which are designated as O and E, respectively, The incoming beam enters the walk-off device 12 of the OPSOC 10 at port 16 which is adapted to receive the incoming light and functions as an input. The E-polarized beam passes through the polarization interchanger 14, where the polarization, as explained, is interchanged by 90 degrees. The E-polarized component is changed into O-polarized at the outputs and there are two parallel O-polarized beams. That is, the two beams exiting from the device are parallel and have parallel polarizations after polarization interchanging. The walk-off device 12 may be fabricated from a birefringent material such as calcite or rutile; such materials are well known and the walk-off device will be readily fabricated by those skilled in the art as will the polarization interchanger 14. As would be understood, the main requirement for the walk-off device is to separate incoming polarizations of the input beam into parallel outgoing beams of orthogonal polarization.

Although the beam is shown as going from left to right with the device operating as a polarization splitter, the device may also be operated as a polarization combiner with the two O-polarized beams going from right to left and entering the device on the right side. The polarization interchanger 14 is now used so that the O-polarized component is changed into E-polarized when combining. When combining, the walk-off device 12 then walks the E and O-polarized beams together so that both beams combine and exit at port 16 which now functions as an output.

Figure 2:
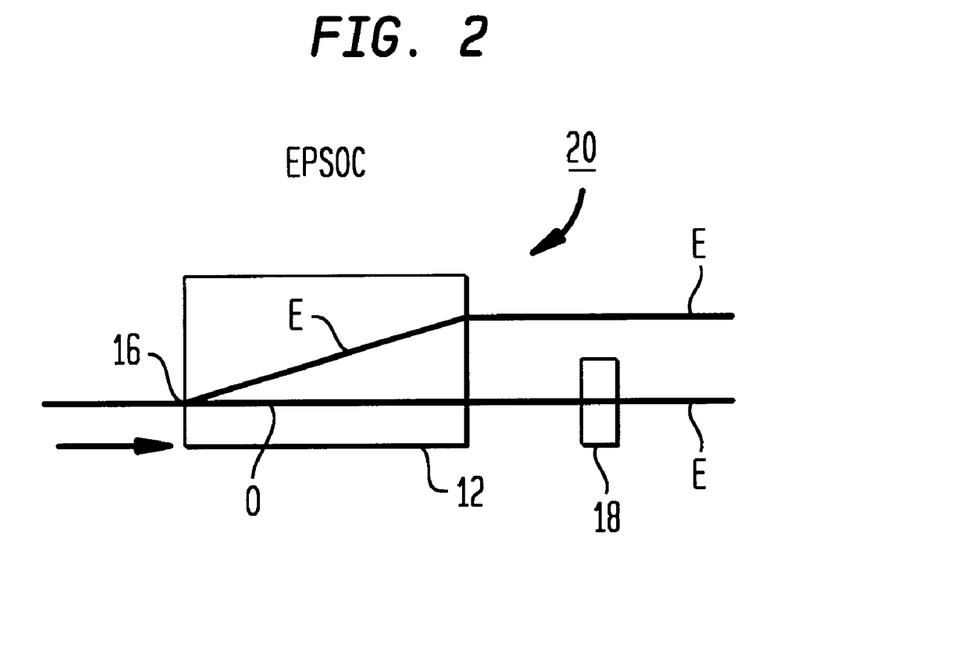
FIG. 2 is a sectional view of an E polarization splitter or combiner (EPSOC) optical device used in conjunction with the present invention.

The polarization interchanger may also interchange the polarization of the O-polarized beam exiting from the first walk-off device; such a device 20 is depicted in FIG. 2. The device is similar to that depicted in FIG. 1 except that the two outgoing beams are E-polarized beams because the O-polarized beam passes through polarization interchanger 18. Accordingly, the device 20 is conveniently referred to as an Extraordinary Polarization Splitter Or Combiner or EPSOC. The EPSOC device 20 is generally similar to the OPSOC device; however, the polarization interchanger 18 is used to change the O-polarization component into E-polarization when splitting and to change the E-polarization component into O-polarization when combining.

Figure 3:
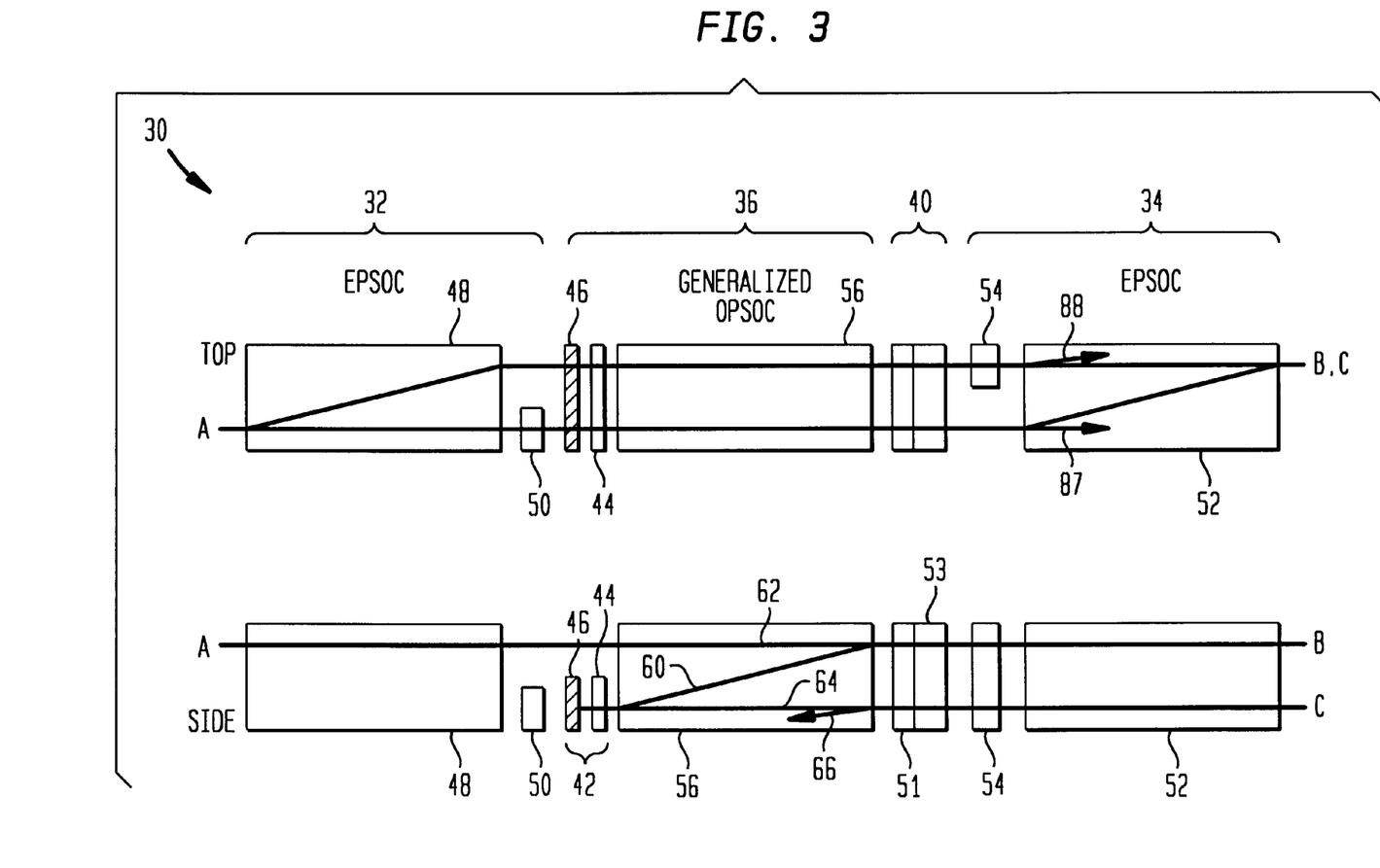
FIG. 3 shows top and side views of one advantageous exemplary embodiment of a 3-port circulator/1×2 switch illustrated in accordance with the present invention.

The devices depicted in FIGS. 1 and 2 may be used individually or they may be combined, possibly with other elements, in yet more complicated devices. In the more complicated devices, a non-reciprocal section may be positioned between the devices to receive one or more of the beams. Such a device, a 3-port circulator/switch device 30, is shown in FIG. 3 which illustrates a top and side view of the device. As shown, the 3-port circulator device 30 incorporates a first EPSOC 32 and a second EPSOC 34 having a "generalized OPSOC" 36 and a non-reciprocal polarization interchanger 40 coupled therebetween. As will be explained in greater detail herein, the generalized OPSOC 36 includes a quarter wave plate 44 and mirror 46 (providing a "reflective polarization interchanger" 42) rather than a half wave plate, where the quarter wave plate provides a conversion to circular polarized light rather than orthogonal linear polarization provided by a half wave plate. In fact, the quarter wave plate may be thought of as a "half polarization changer" in that it must be used twice (in connection with the mirror 46) to effect a linear polarization change. It should be noted that the half wave plates used for the EPSOC and OPSOC devices have their "fast" axis at 45 degrees relative to the polarization directions; the quarter wave plate used with a "generalized OPSOC" and "generalized EPSOC" are also oriented at 45 degrees relative to linear polarizations. As would be understood by a person skilled in the art, the directions parallel and perpendicular to the optic axis in certain types of (crystal) plates, e.g., negative crystals are often called the "fast" and "slow" axes, whereas in a positive crystal plates, these designations relative to the axis are interchanged.

As will be apparent from the description herein, depending on the orientation of the mirror 46, the generalized OPSOC 36 can be made to separate an unpolarized beam into two mutually anti-parallel O-polarized beams or to produce two O-polarized beams which are not mutually anti-parallel, thus the term generalized OPSOC (and "generalized EPSOC"). As shown, the non-reciprocal polarization interchanger 40 is coupled between the generalized OPSOC 36 and the second EPSOC 34, and the polarization interchanger 42 of the generalized OPSOC 36 includes a quarter wave plate 44 and a mirror 46. As will be explained in greater detail herein, such a reflective design, utilizing the quarter wave plate 44 and the mirror 46 as a reflective polarization interchanger 42 for the surrounded generalized OPSOC 36 (or generalized EPSOC, e.g., in other embodiments) will enable dual fiber terminators and a shared collimating system, for example, a GRIN, to be advantageously utilized in connection with the present invention. Although shown as using a quarter wave plate, it would be understood that the reflective polarization interchanger could also utilize a 45 degree Faraday rotator, which rotates light 45 degrees each pass to total a 90 degree rotation.

More particularly, as shown in FIG. 3, the first and second EPSOC devices 32,34 are formed by walk-off device 48 and polarization interchanger 50 and by walk-off device 52 and polarization interchanger 54, respectively. The generalized OPSOC device 36 is formed by walk-off device 56 and reflective polarization interchanger 42 which is comprised of a quarter wave plate 44 (or 45 degree Faraday rotator) and mirror 46, although the quarter wave plate could be any odd multiple of a quarter wave plate or even an odd multiple of a 45 degree Faraday rotator As would be understood, because of the mirror 46 located behind it, the quarter wave plate 44 which is double passed by an incoming beam (and subsequently reflected beam) acts as a polarization interchanger. Between the OPSOC 36 and second EPSOC 34 devices is the non-reciprocal device 40, made up, for example, of a suitable Faraday rotator 51 and suitably oriented half wave plate 53, although other elements may also be used, as would be understood by a person skilled in the art. As shown in FIG. 3, the walk-off devices 48,52,56 are oriented such that a walk-off direction is indicated by the divergence in the optical paths, i.e., by the oblique paths in the devices. That is, the walk-off direction for the EPSOC devices is indicated from the top view and the walk-off direction of the OPSOC device is indicated in the side view. The present invention device-has three ports which are shown as A, B, C.

Briefly describing the non-reciprocal device 40 of FIG. 3, it would be understood that the Faraday rotator is used in conjunction with a magnetic field that is either approximately parallel to the beam direction or approximately anti-parallel to the beam direction. For a given Faraday material and optical wavelength, the amount of rotation of the plane of polarization for a given thickness of material can be readily determined. Reversing the direction of the beam propagation without a reversal of the direction of the magnetic field will cause the rotation direction of the plane of polarization relative to the beam direction to be in the opposite sense. By choosing a thickness of the material so that the amount of rotation is about 45 degrees, useful, non-reciprocal behavior can be obtained with the use of a polarization rotator as the suitably oriented half-wave plate 53. If the plate 53 is oriented to also rotate the plane of polarization 45 degrees, then a beam passing in one direction through the combination of elements 51 and 53 will experience a polarization interchange whereas the beam will experience no change in the reverse direction. This behavior can be achieved without requiring that elements 51 and 53 be in contact with each other and can be achieved with element 51 following element 53. One skilled in the art would also understand that optical activity could be used instead of birefringence for element 53. In the following discussion regarding FIG. 3, it is assumed for purposes of exposition that the beams passing from left to right through the pair of elements 51, 53 experience no change in polarization; and for beams passing from right to left, it is assumed for purposes of exposition that the polarization is interchanged 90 degrees.

The operation of the circulator depicted in FIG. 3 can now be described. Light propagation from port B to port C will first be described. An unpolarized incoming beam enters walk-off device 52 at port B and is separated into O and E-polarized beams as shown in the top view. The O-polarized beam has its polarization interchanged by polarization interchanger 54 so that the polarizations of both beams are now parallel. The two top beams as shown superimposed in the side view next pass through the non-reciprocal device 40, for example a combination of elements 51 and 53 and, by the assumptions made above for purposes of exposition, the polarizations of both beams are interchanged by 90 degrees. Due to the orientation of the generalized OPSOC device 36 relative the second EPSOC device 34, where the walk-off planes of each device are shown, for example, as being perpendicular to one another, the two beams enter the walk-off device 56 as E-polarized with respect to this walk-off device 56. The two beams entering the walk-off device 56 of the OPSOC device 36 get walked off according to the direction of the extraordinary path as shown by the lower paths 60 in the side view of FIG. 3. As would be readily understood, the two beams are located on top of one another in this side view.

As would also be understood, if the beams had possessed the opposite polarization when entering the walk-off device 56 of the generalized OPSOC 36 and not had their polarization interchanged by the non-reciprocal device, the beams would have entered the walk-off device as O-polarized beams relative the walk-off device and followed the ordinary paths 62.

Both beams next enter reflective polarization interchanger 42, where the beams pass through the quarter wave plate 44 a first time and are then reflected off of the mirror 46 so that the beams pass through the quarter wave plate 44 a second time, each time experiencing a partial polarization conversion. For example, linear polarized light passing through the quarter wave plate whose principle axes are 45 degrees with respect to the input polarization convert the light to circular polarization and the circularly polarized light returned by the mirror 46 is converted back by the quarter wave plate to linear polarization (which is now perpendicular to the input polarization). This double pass through the quarter wave plate 44 has the same polarization interchanging effect, where the polarization interchange is the exchange of two specific polarizations into each other, e.g., vertical to horizontal and vice versa, as if the beams had passed through a half wave plate a single time. As would be understood, this assumes that the fast axis of the quarter wave plate and half wave plates are 45 degrees to vertical, horizontal (except for the half wave plate 53 used in connection with the non-reciprocal device 40). Since the two beams emerging from the reflective polarization interchanger 42 have experienced a polarization interchange, these beams would now be considered as O-polarized with respect to the walk-off device 56 of the generalized OPSOC 36 and would now follow the ordinary (lower) path 64 of this walk-off device. Continuing the paths of the two beams exiting the walk-off device 56 of the generalized OPSOC 36, the lower beams each enter the non-reciprocal polarization interchanger 40 once again, this time traveling left to right, and by the assumptions made earlier, neither beam will experience any polarization effect while traveling in this direction through the non-reciprocal polarization interchanger. One of these beams (top beam in the top view) will now experiences a polarization interchange from polarization interchanger 54 of the second EPSOC 34 so that this beam is now O-polarized relative the walk-off device 44 of the second EPSOC 34. The second beam (lower beam in the top view) experiences no polarization interchange and is E-polarized with respect to walk-off device 52 of the EPSOC 34. This walk-off device 52 walks the two beams together so that they both exit from port C.

The propagation of a light beam entering port A is now readily understood. An unpolarized beam is split into O and E polarization components by walk-off device 48 of the first EPSOC device 32 and polarization interchanger 50 interchanges the polarization of the lower beam as shown in the top view of FIG. 3. Both beams bypass the reflective polarization interchanger 42 (sideview) and enter the walk-off device 56 of the generalized OPSOC device 36 as O-polarized with respect to this walk-off device, where the ordinary (top) paths 62 as shown in FIG. 3 are followed. The two beams next enter the non-reciprocal polarization interchanger 40 and based on previous assumptions, the polarizations of the two beams remain unaffected. Due to the orientation of the walk-off device 56 of the generalized OPSOC device 36 relative the second EPSOC device 34, the two beams emerging from the non-reciprocal polarization interchanger 40 are E-polarized relative to walk-off device 52. The top beam (in the top view) has its polarization interchanged by polarization interchanger 54 so that this beam is O-polarized relative walk-off device 52. The walk-off device 52 of the second EPSOC 34 then walks the two beams together so that they both exit at port B.

Given the above assumptions, regarding the non-reciprocal polarization interchanger 40 with respect to the current explanation, it would be understood that light entering port C of the present invention circulator/switch device 30, as shown in FIG. 3, would not emerge at any of the ports according to circulator operation. Illustrating this point more specifically, an unpolarized incoming beam enters walk-off device 52 at port C and is separated into O and E polarized beams as shown in the top view. The O-polarized beam has its polarization interchanged by polarization interchanger 54 so that the polarizations of both beams are now parallel. The two lower beams as shown in the side view next pass through the non-reciprocal device 40 and by the assumptions made above for purposes of exposition, the polarizations of both beams are interchanged by 90 degrees. Due to the orientation of the generalized OPSOC device 36 relative the second EPSOC device 34, the two beams enter the walk-off device 56 as E-polarized with respect to this walk-off device 56. These two beams would then get walked off (path 66) according to the direction of the extraordinary path and would be lost and not emerge from any of the ports A, B or C.

Propagation between all ports is now readily understood by a person skilled in the art without further explanation. Specifically, given the assumptions from above, light entering at port B will exit at port C and light entering port A will emerge at port B, but light entering port C will not emerge from any of these ports. As would be understood, if the action of the non-reciprocal device 40 is changed, for example, by altering the direction of the applied magnetic field, this will also directly affect the operation of the circulator 30. For example, given the opposite assumption that light traveling from right to left in the device 40 of FIG. 3 will experience no polarization interchange and that light traveling from left to right will experience a polarization interchange, the operation of the circulator of FIG. 3 can be described as follows. Light entering port B will emerge at port A and light entering port C will emerge at port B. Light, however, entering port A under the instant assumptions will not emerge, but will follow paths 87 and 88. Thus, it can be seen that circulator/switch operation can be implemented using the present invention. That is, it would be clear to one skilled in the art that controlling the direction of the applied magnetic field will control the action of the circulator; hence controlling the magnetic field is a means to achieve switching action.

Figure 4:
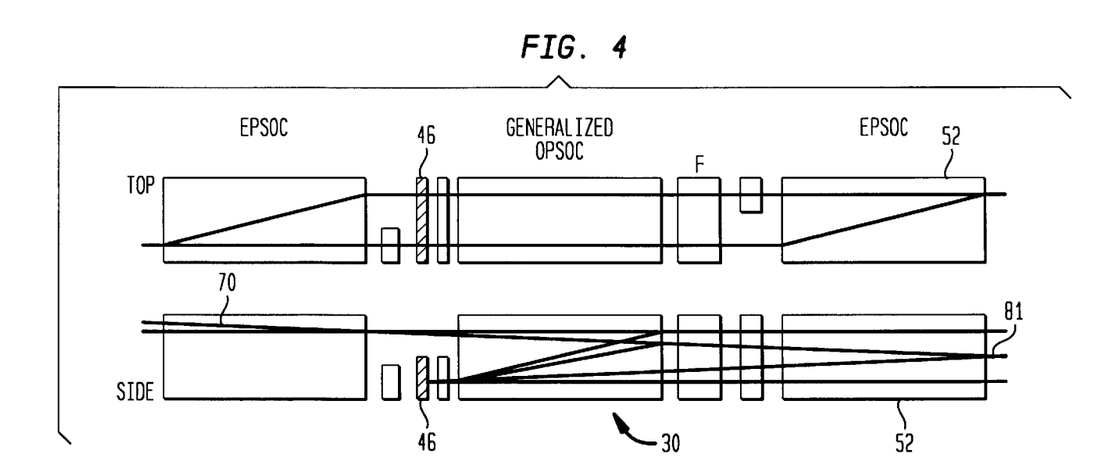
FIG. 4 shows additional ray tracings added to the exemplary embodiment of the present invention shown in FIG. 3.
Figure 5:
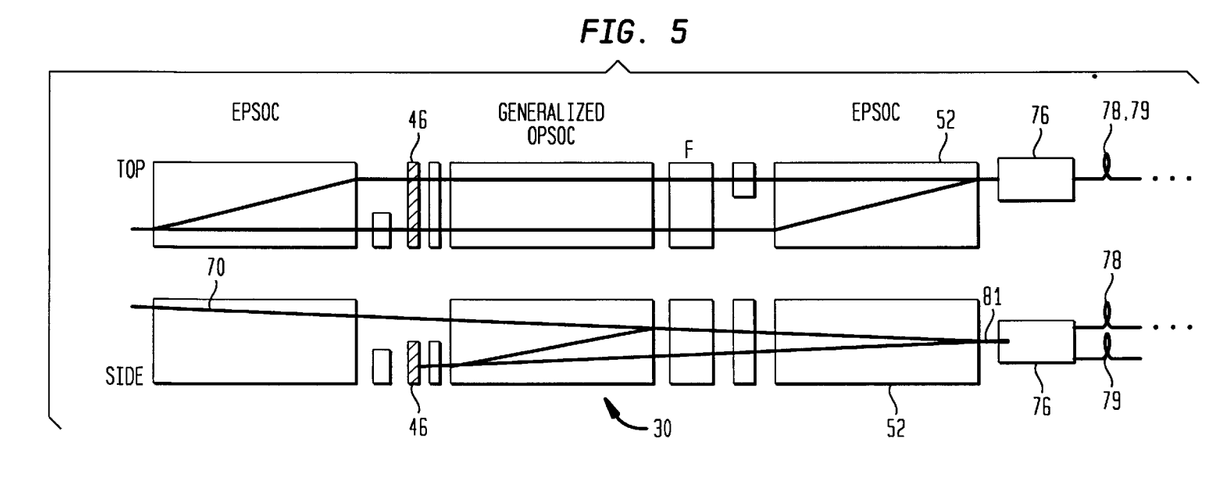
FIG. 5 shows the additional ray tracings of FIG. 4 and also coupling means to a dual termination by a dual focusing element.

A significant advantage of the present invention circulator/switch device 30 is that the device lends itself for use with dual fiber terminators and a shared collimating system, such as, a GRIN, curved mirror or other type of lens. FIG. 4 illustrates the present invention device for the embodiment of FIG. 3 having selected exemplary model ray traces superimposed with the original ray traces of FIG. 3. As will become apparent, these additional ray traces show that the present invention device may be used with a dual fiber termination where two fiber ends are located next to each other (whereas ports B and C including the original ray traces as shown in FIG. 3 are not shown coupled to a dual fiber termination). FIG. 5 shows the exemplary embodiment with the original ray traces deleted for clarification sake. As can be seen, FIGS. 4 and 5 show the additional ray tracing from the face of the mirror 46 all the way to the right-most portion of the drawing where refraction in the walk-off devices, for example, in rutile, is handled approximately as described. The figure also approximately illustrates the continuation of upper rays 70 as it would travel through the device toward port A, assuming the conditions in the non-reciprocal polarization interchanger are appropriate to produce such behavior. FIGS. 4 and 5 do not, however, take into consideration the slight effects of refraction as seen by the quarter and half wave plates.

The exemplary embodiments shown in FIGS. 3, 4 and 5 show the vertical dimension sketched approximately twice as large as the horizontal dimension. That is, the exemplary walk-off beam representations are shown as approximately 1 in 5 for typical slope when in fact they are actually about 1 in 10 (5.6–5.7 degrees) for rutile. An opening angle of 3.8 degrees (±1.9 degrees in air propagation) was assumed in a working exemplary embodiment for collimated beams coupled to a collimating device 76, such as a GRIN, and a dual fiber termination 78, as shown in FIG. 5. In the figures, an opening angle of approximately 7.6 degrees (±3.8 degrees in air propagation) was drawn with respect to the horizontal for clarification of viewing. Rutiles's: relatively large index makes the beam propagation closer in angle to the horizontal ray traces of FIG. 3, however, so an angle of deviation of ±1.4 degrees was drawn for the rutile.

Careful examination of the exemplary model ray traces shown in FIGS. 4 and 5 show that the (±3.8 degree) rays emanating from the surface of the mirror 46 cross or intersect very slightly to the right of the right-most walk-off device 52 at intersection point 81. It would also be understood that this point of intersection could occur at a point just within the walk off device 52. As would be understood by a person skilled in the art, if the size of the air space between the components was reduced, the point of intersection would be placed farther to the right of the right-most walk-off device 52. Moreover, positioning of the mirror 46 with respect to the other components, e.g., movements closer or farther with respect to the walk off device 56 or tilting the orientation of the mirror in one or more directions may effectively control the point of intersection for the beams reflected therefrom. Advantageously, the present invention enables use of this intersection point (where the two beams from the mirror cross) as a location to collimate the two beams using a collimator 76 into a dual fiber termination 78 and 79 as shown in FIG. 5, where the dual termination indicates two fiber ends located next to each other.

Figure 6:
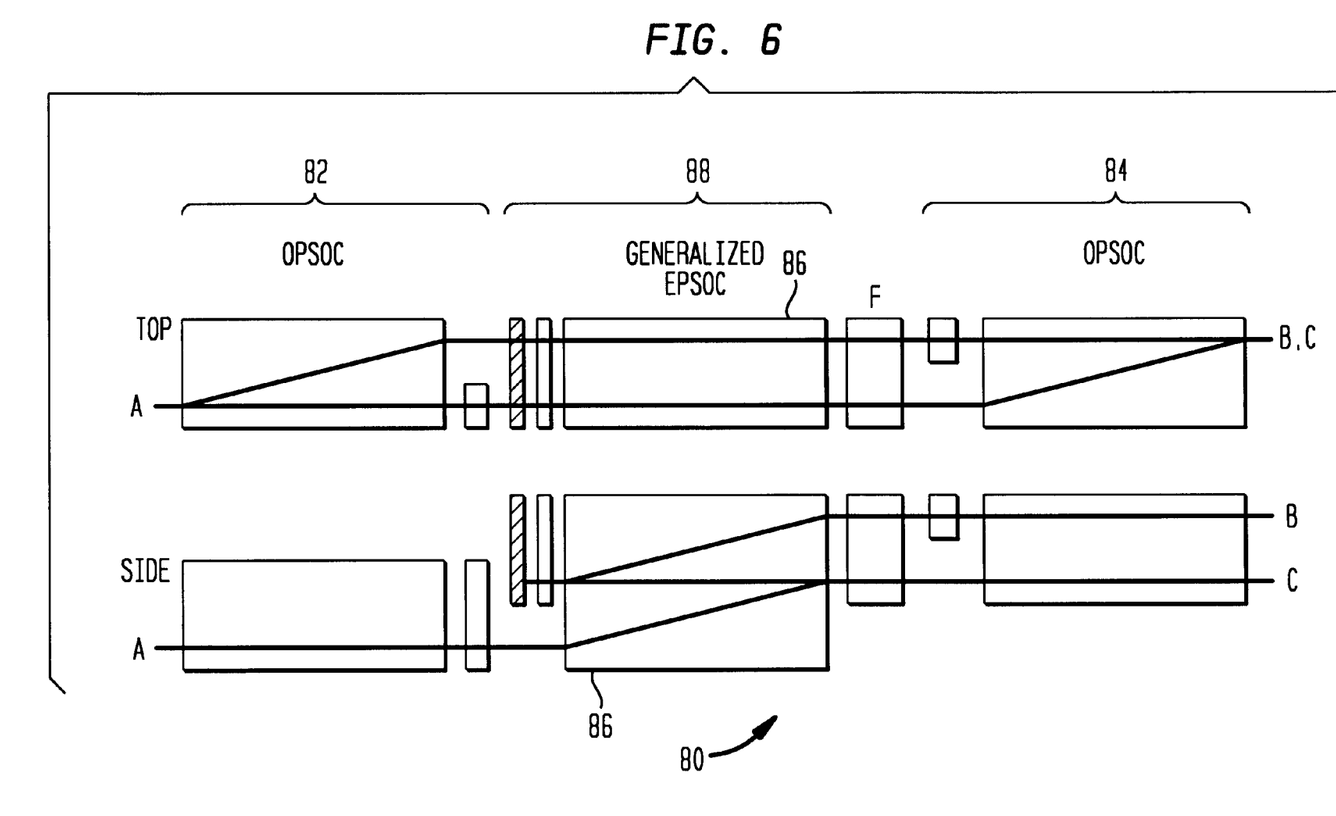
FIG. 6 shows top and side views of an alternate exemplary embodiment of a 3-port circulator/1×2 switch illustrated in accordance with the present invention.

An alternate embodiment of the present invention circulator/switch is shown in FIG. 6, the operation of which would be readily understood by those skilled in the art given the previous description. The embodiment of the circulator/switch 80 of FIG. 6 is similar to that shown in FIG. 3 with the exception that OPSOC devices 82,84 are substituted for the EPSOCs and a generalized EPSOC is used instead of a generalized OPSOC. Also the walk-off device 86 of the generalized EPSOC 88 was made taller and the right hand OPSOC 84 was raised relative to the left hand OPSOC 82. Those skilled in the art would realize that the walk off devices may be used to reduce the required height of walk-off device 86 and to re-align the other optics.

As would be understood, the paths followed within the EPSOCs and OPSOCs and the generalized EPSOC and OPSOC of the embodiments shown in FIGS. 3 and 6 are not exactly matched, i.e., there are different path lengths. Also it is not expected that that the E and O polarizations within a walk-off device experience the same length of path nor the same effective. index of refraction. Additionally, beams passing through polarization interchangers have a different path length as compared to traveling around the polarization interchangers.

The preferred embodiments of the present invention 3-port circulator device shown in FIGS. 3,4,5,6 are arranged to equalize the overall optical path lengths for the two polarization cases. For example, a preferred embodiment may require that a first EPSOC and second EPSOC be relatively inverted (where the polarization interchangers of the EPSOCs are included in alternate paths) such as depicted in FIG. 3 equalizing alternative polarization paths between A and B. These preferred embodiments help to equalize the optical path lengths and hence minimize polarization mode dispersion (PMD) as well a polarization dispersion loss (PDL). Moreover, the optical path length difference between, say, B and C can be adjusted by placing a glass plate, for example, having a suitable anti-reflective coating, or another transparent material in the shorter optical path to equalize path lengths. If the path length compensation is to be very slight, it may be easier to place compensating plates in both paths with a slight optical differential between them so as to match the slight differential in the paths that existed originally. One can also consider other design variations such as using inversion of only the non-reflected side so that needed compensations are applied for both the transmitted and reflected paths. In this way polarization mode dispersion (PMD) and polarization dependent loss (PDL) can be expected to be minimized.

Variations in the embodiments depicted will be readily apparent by those skilled in the art given the instant disclosure. For example, the term walk-off device is used to mean any device that yields parallel beams with orthogonal polarizations. Additionally, the polarization interchanger may be implemented by other means such as by Faraday rotation or by optical activity in either case by an odd multiple of 90 degrees. The polarizations may or may not be parallel/perpendicular to the beam separation direction. Thus, the invention includes embodiments that are not characterized as either EPSOC or OPSOC. These embodiments may be referred to as LPSOC which is the acronym for "Like Polarization Splitter Or Combiner." Thus, the term LPSOC (and generalized LPSOC) includes not only EPSOCs and OPSOCs (and generalized EPSOCs and OPSOCs) but also cases where the "like" polarizations are linear and at an acute angle (say 45 degrees) to the walk-off plane or circular elliptical and have the same characteristic parameters (e.g., axes orientation, ellipticity and rotational characteristics). For example, it will be noted that in the illustrative embodiment of FIG. 3, the two LPSOCs and one generalized LPSOC in the figure (2 EPSOCs and 1 generalized OPSOC) require that a first and third LPSOC have walk-off planes parallel to one another and that the second generalized LPSOC have a walk-off plane perpendicular to the others. It would be understood, however, that the walk-off plane of the first and third LPSOC need not be parallel nor perpendicular to the walk-off plane of the second generalized LPSOC.

Also, although some figures were described with respect to a "half wave plate," this term is used to mean a (n+½) wave plate. Additionally, those skilled in the art would readily realize that the interchange order of any neighboring pairs of half wave plates do not materially change the performance of the design. It would also be understood that the walk-off devices may be fabricated from a birefringent material such as calcite or rutile or also made from polarizing optical coatings; such materials and methods of fabrication are well known and the walk-off device will be readily fabricated by those skilled in the art as will the polarization interchanger.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An optical apparatus comprising
   a first polarization splitting-combining device including, a first walk-off device having a splitting end and a combining end, said splitting end including a single input/output port and said combining end including two input/output ports, said first polarization splitting-combining device further including a first polarization interchanger disposed proximate one of said two input/output ports at said combining end of said first walk-off device;
   a second polarization splitting-combining device including, a second walk-off device having a splitting end and a combining end, said splitting end including two input/output ports and said combining end including four input/output ports, said second polarization splitting-combining device further including a second polarization interchanger disposed proximate two of said four input/output ports at said combining end of said first walk-off device;
   a first generalized polarization splitting-combining device including, a third walk-off device having four input/output ports at a first end thereof and four input/output ports at a second end thereof, said first generalized splitting-combining device including a reflective polarization interchanger disposed proximate two of said four input/output ports at said second end, said first generalized polarization splitting-combining device coupled between said first and second polarization splitting-combining device such that said four input/output ports at said combining end of said second walk-off device couple to said four input/output ports of said first end of said third walk-off device, and two of said four input/output ports of said third walk-off device, not including two of said four input/output ports of said third walk-off device coupled to said reflective polarization interchanger, couple to said two input/output ports at said combining end of said first walk-off device; and
   a non-reciprocal polarization interchanger positioned between said second splitting-combining device and said first generalized polarization splitting-combining device.

2. The apparatus of claim 1, wherein said first and second splitting-combining device are E polarization splitter or combiner (EPSOC) devices.

3. The apparatus of claim 1, wherein said first and second splitting-combining device are O polarization splitter or combiner (OPSOC) devices.

4. The apparatus of claim 1, wherein walk-off planes of said first and second walk-off device, and walk-off planes of said second and third walk-off device are perpendicularly oriented with respect to one another.

5. The apparatus of claim 1 wherein each of said first and second walk-off device is capable of separating an incoming light beam on one of its input/output ports at a splitting end into two parallel light beams of orthogonal polarization on two of its input/output ports or combining two parallel light beams of orthogonal polarization on separate ones of its input/output ports at a combining end into one light beam on one of its inputs, and each said interchanger is capable of changing the polarization of one of said two beams so that the polarization of both beams exiting said first and second splitting-combining device are essentially the same or to change the polarization of one of two incoming beams entering at said combining end of an associated walk-off device.

6. The apparatus of claim 1, wherein said reflective polarization interchanger includes an odd multiple 45 degree Faraday rotator.

7. The apparatus of claim 1, wherein said mirror is positioned relative said third walkoff device such that beams traveling through said two input/output ports at said splitting end of said second walk-off device intersect with one another at a point proximate said two input/output ports of said second walk-off device.

8. The apparatus of claim 7, wherein alternate positioning of said mirror produces an alternate position of said point of intersection.

9. The apparatus of claim 7, wherein said two input/output ports at said splitting end of said second walk-off device are adapted for termination using a shared collimating device and a dual fiber termination.

10. The apparatus of claim 9, wherein said collimating device is a GRIN.

11. The apparatus of claim 9, wherein said collimating device is a device other than a GRIN.

12. The apparatus of claim 2, wherein the polarization interchangers of said first and second EPSOC devices are relatively inverted with respect to one another.

13. The apparatus of claim 3, wherein the polarization interchangers of said first and second OPSOC devices are relatively inverted with respect to one another.

14. The apparatus of claim 12, wherein relative inversion of said polarization interchangers equalizes overall optical path lengths of pairs of paths between given input/output ports.

15. The apparatus of claim 13, wherein relative inversion of said polarization interchangers equalizes overall optical path lengths of pairs of paths between given input/output ports.

16. The apparatus of claim 1, wherein said non-reciprocal optical device includes a Faraday rotator.

17. The apparatus of claim 16, wherein said non-reciprocal optical device further includes a half-wave plate.

18. The apparatus of claim 1, wherein each said walk-off device comprises a birefringent material.

19. The apparatus of claim 1, wherein at least one said polarization interchanger comprises a Faraday rotator.

20. The apparatus of claim 1, wherein at least one said polarization interchanger comprises an optically active material.

21. The apparatus of claim 1, wherein said reflective polarization interchanger includes an odd multiple quarter wave plate and a mirror.

22. The apparatus of claim 1, wherein said non-reciprocal polarization interchanger is operable to be changed from a first state to a second state, wherein changing said polarization interchanger from said first state to said second state causes a light beam entering one of three ports of said optical apparatus to behave differently than when in said first state.

23. The apparatus of claim 22, wherein said apparatus is operable as a 1×2 switch when said polarization interchanger is changed from a first state to a second state.

24. An optical circulator-switch apparatus comprising:

at least a first and second like polarization splitter or combiner (LPSOC) device optically coupled in series with one another, each of said LPSOC devices having a splitting end and a combining end, at least a first generalized LPSOC device optically coupled in series between said first and second LPSOC device, said first generalized LPSOC including a first end and a second end;

said splitting end of said first LPSOC device having one input/output port and said combining end having two input/output ports, said splitting end of said second LPSOC device having two input/output ports and said combining end having four input/output ports, and said first end of said first generalized LPSOC device having four input/output ports and said second end having two input/output ports, said combining end of said first LPSOC and said second end of said first generalized LPSOC devices being coupled to one another and said first end of said first generalized LPSOC and said combining end of said second LPSOC being coupled to one another, each of said LPSOC devices including a walk-off device having a walk-off plane, said walk-off plane of said first and second LPSOC devices being parallel to one another, said first generalized LPSOC including a reflective polarization interchanger disposed at said second end, and a non-reciprocal polarization interchanger positioned between said second LPSOC device and said first generalized LPSOC device.

25. The apparatus of claim 24, wherein said walk-off plane of said first generalized LPSOC device is perpendicular to said walk-off plane of said first and second walk-off devices.

26. The apparatus of claim 24, wherein said first and second LPSOC devices are O polarization splitter or combiner (OPSOC) devices and said first generalized LPSOC devices is a generalized E polarization splitter or combiner (generalized EPSOC) device.

27. The apparatus of claim 24, wherein said first and second LPSOC devices are E polarization splitter or combiner (EPSOC) devices and said first generalized LPSOC device is a generalized O polarization splitter or combiner (generalized OPSOC) device.

28. The apparatus of claim 24, wherein the first and second LPSOC devices are relatively inverted with respect to one another.

29. The apparatus of claim 28, wherein relative inversion of said LPSOC devices equalizes overall optical path lengths of pairs of paths between a given input port and a given output port.

30. The apparatus of claim 24, wherein each of said first and second LPSOC devices includes a polarization interchanger disposed proximate said combining end thereof, the polarization interchanger of said first LPSOC device disposed between a first pair of said four input/output ports, and the polarization interchanger of said second LPSOC device disposed between a single one of said two input/output ports, so that polarization interchangers of said first and second LPSOC are not coupled in the same optical path.

31. The apparatus of claim 24, wherein said mirror is positioned relative said third walk-off device such that beams exiting said two inputs of said second walk-off device intersect with one another at a point proximate said two inputs of said second walk-off device.

32. The apparatus of claim 31, wherein said two inputs of said second walk-off device are adapted for termination using a shared collimating device and a dual fiber termination.

33. The apparatus of claim 24, wherein said apparatus is operable as a 1×2 switch when said polarization interchanger is changed from a first state to a second state.

* * * * *